Figure 1:
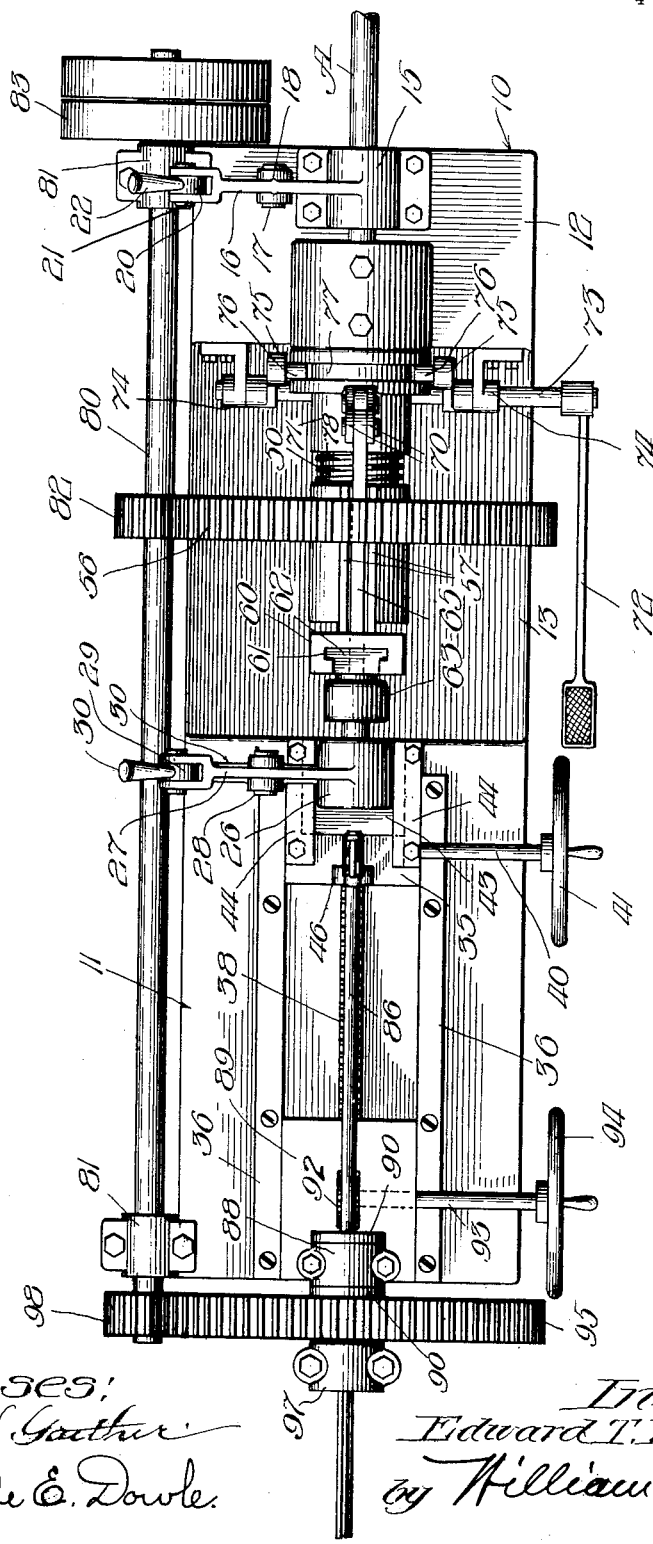

E. T. HENDEE.
WELDING MACHINE.
APPLICATION FILED MAY 4, 1914.

1,115,195.

Patented Oct. 27, 1914.
4 SHEETS—SHEET 1.

Witnesses:
Harry S. Gaither
Gertrude E. Dowle

Inventor
Edward T. Hendee
by William W. Hall
Atty

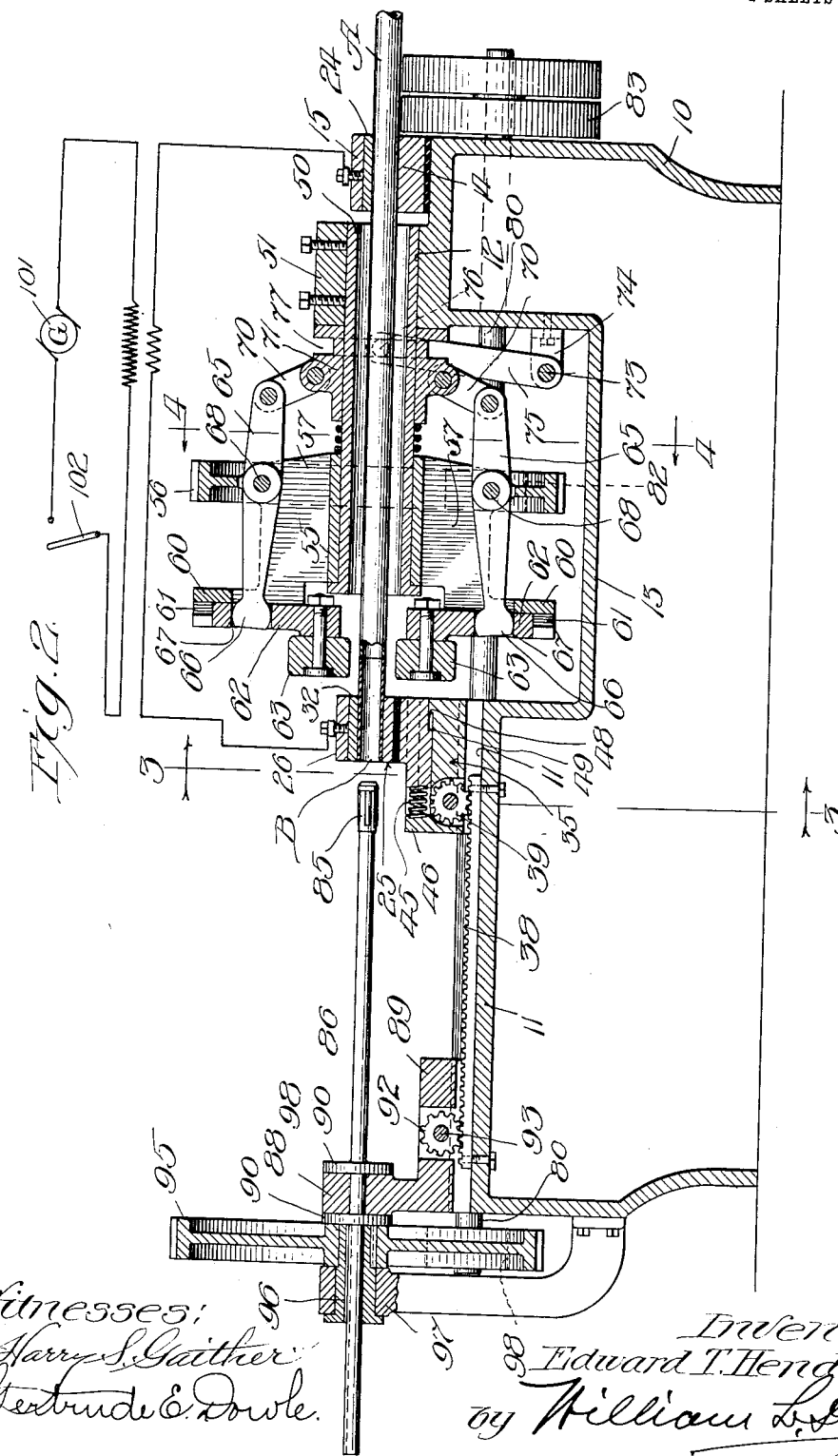

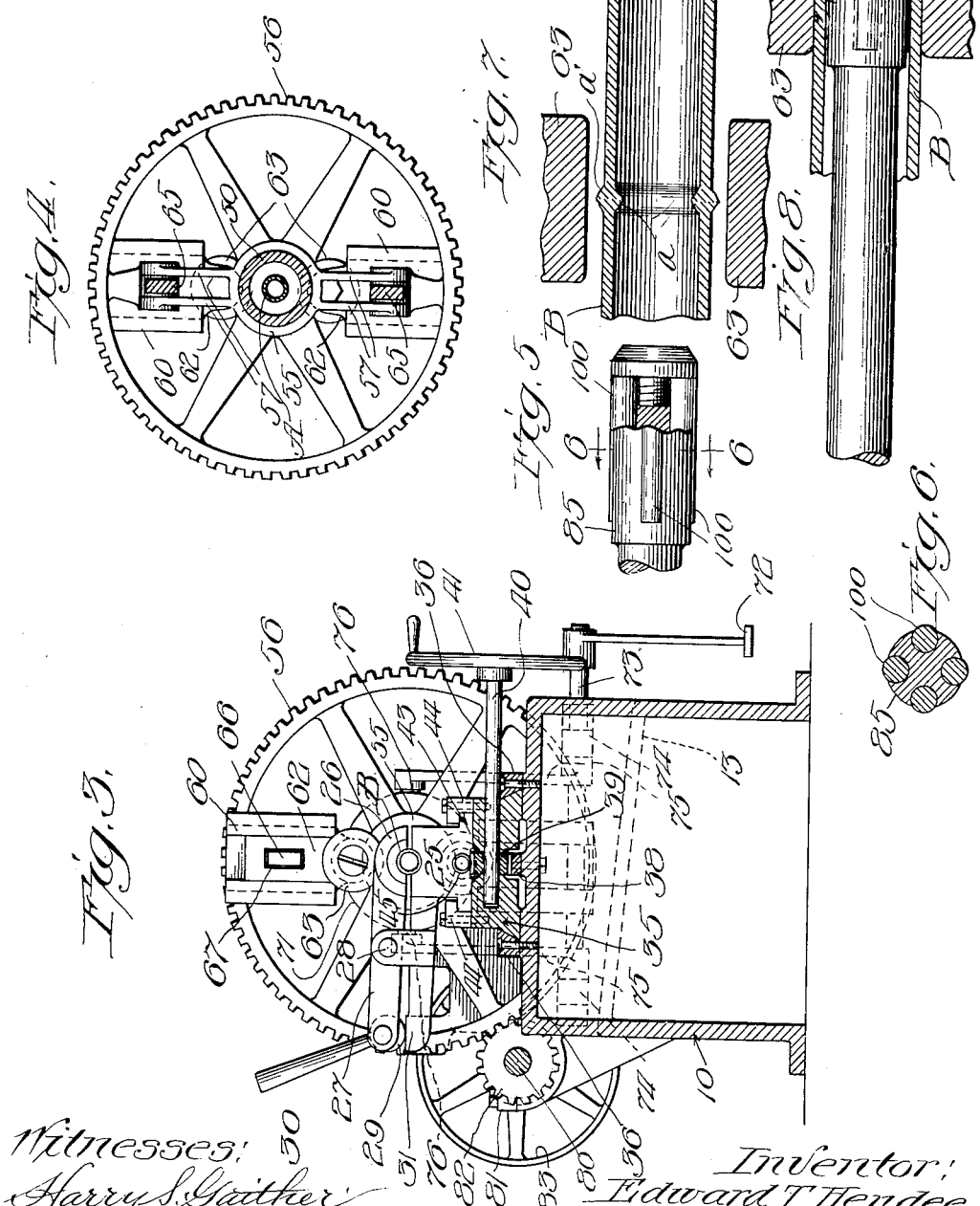

E. T. HENDEE.
WELDING MACHINE.
APPLICATION FILED MAY 4, 1914.
1,115,195.
Patented Oct. 27, 1914.
4 SHEETS—SHEET 4.
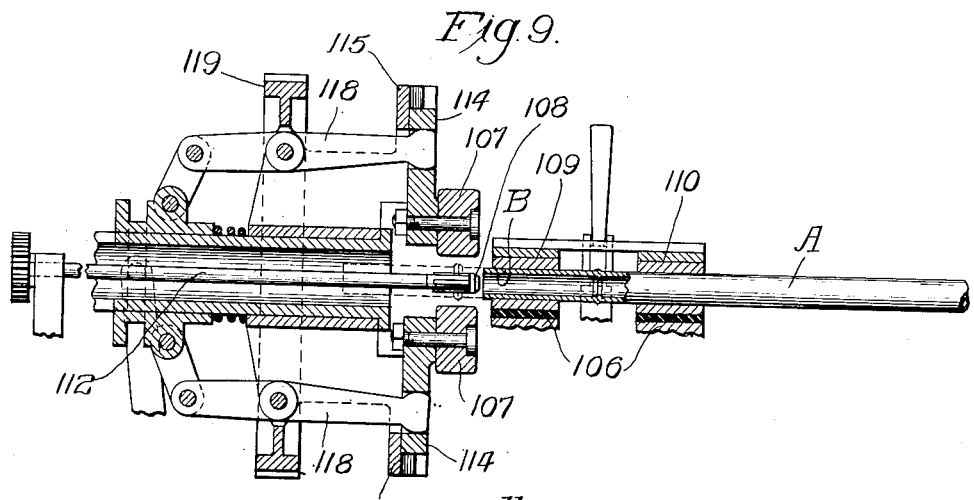
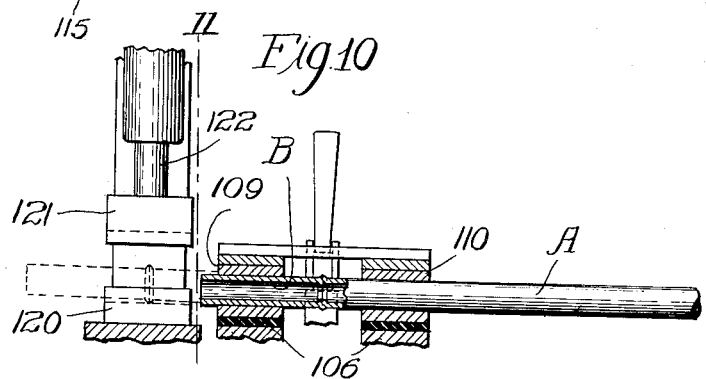
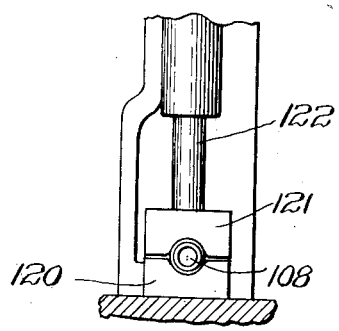
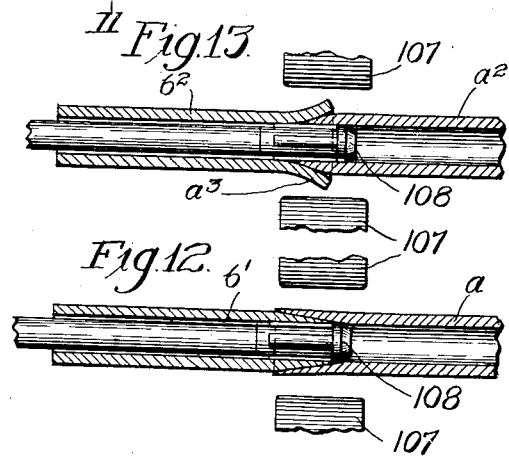
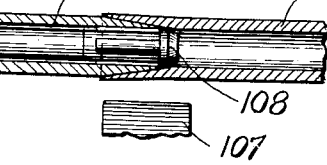
Witnesses:
Harry S. Gaither
Gertrude E. Dowle
Inventor
Edward T. Hendee
by William L. Hall,
Attys.

UNITED STATES PATENT OFFICE.

EDWARD T. HENDEE, OF CHICAGO, ILLINOIS.

WELDING-MACHINE.

1,115,195.  Specification of Letters Patent.  Patented Oct. 27, 1914.

Application filed May 4, 1914. Serial No. 836,082.

*To all whom it may concern:*

Be it known that I, EDWARD T. HENDEE, a citizen of the United States, and a resident of Chicago, in the county of Cook and State of Illinois, have invented certain new and useful Improvements in Welding-Machines; and I do hereby declare that the following is a full, clear, and exact description thereof, reference being had to the accompanying drawings, and to the characters of reference marked thereon, which form a part of this specification.

This invention relates to a novel welding machine for welding boiler flues and other elongated tubular or non-tubular articles. The machine is herein shown as designed more particularly for welding tubular articles, and is herein specifically described with respect to such work; but in certain of its aspects the invention is adapted for welding other or non-tubular articles.

A machine embodying my invention embraces, in general terms, means for applying heat to the two articles to be welded, while they are held in endwise contact, to raise the temperature of the metal of the joint to a welding heat, whereby the molecules of the metal of the parts to be welded are united, combined with means for pressing, rolling or hammering the metal at the joint while it still retains sufficient heat to be deformed, so as to thereby provide a smooth welded joint; said rolling, pressing or hammering means being applied to the welded joint while the flue or other article remains in the machine.

I have herein shown simple forms of machines embodying the general features of the invention, and the machines illustrated are designed with particular reference to electrically welding the short or "safe ends" of boiler flues to the longer sections thereof, and which take the place of the ends of the flues which are usually cut away in removing the flues from the flue sheets.

Among the objects of the invention is to provide a welding machine, for the general purpose set forth, in which the joint smoothing or finishing elements are so disposed relatively to the welding position that the welded article may be quickly and readily presented to the smoothing or finishing means while the metal at the joint is sufficiently hot to be rolled, pressed or hammered down, thereby reducing the cost of the welded joint.

A further object of the invention is to provide a welding machine for welding boiler flues and the like provided with internal and external rolling and pressing means so located with respect to the welding position of the flue as to be quickly applied to the heated joint to internally and externally finish the joint.

The application of the joint finishing elements to the welded heated joint may be effected by moving certain of the finishing elements axially toward the fixed joint; by moving the welded joint axially toward the relatively fixed smoothing elements, or by applying the smoothing elements to the joint simultaneously with the later stages of the welding heat. By each of the arrangements specified is attained the object of applying the required pressure to finish the joint before the metal thereof, which is heated over a relatively short area, has dropped below a workable temperature.

It has heretofore been a common practice in the art of electrically welding boiler flues to reduce the bead or protuberance at the point formed by the displacement of metal during the welding operation by a cold cutting or grinding process, or else by subsequent reheating and rerolling in a separate machine designed for that purpose. Either of these processes is necessarily slow and expensive, and is further objectionable because it requires additional handling of the flues. By the use of my improved welding machine, the expense of finishing the joint and the time and labor required therefor is greatly reduced.

As shown in the drawings:—Figure 1 is a plan view of a welding machine embodying my invention. Fig. 2 is a longitudinal section thereof. Figs. 3 and 4 are transverse sections on the lines 3—3 and 4—4, respectively, of Fig. 2. Fig. 5 is a detail view of the inner form or mandrel for rolling down the bead formed on the inner surface of the welded flue. Fig. 6 is a transverse section on the line 6—6 of Fig. 5. Figs. 7 and 8 are views, diagrammatic in their nature, showing two stages of the process of welding and finishing flues in accordance with my invention. Fig. 9 is a view, diagrammatic in its nature, showing the elements of a modified form of machine. Fig. 10 illustrates the elements of a further modification. Fig. 11 is a sectional detail on the line 11—11 of Fig. 10. Figs. 12 and 13 illustrate two methods of forming a joint.

As shown in Fig. 1 to 8 of the drawings, the frame of the machine comprises a hollow box-like structure 10, which is open at its bottom and is formed at its top to provide horizontal bed plates 11, 12 disposed at different levels for the various parts of the machine. It is formed to provide between the bed plates a depressed portion 13 to receive parts of the operating mechanism, as will hereinafter appear.

14, 15 designate the fixed and movable parts, respectively, of a work supporting clamp which is mounted on the bed plate 12 to receive and support the longer portion of a flue A to be welded. The upper movable member 15 of the clamp is herein shown as formed on or attached to the free end of a clamping lever 16 (Fig. 1) which is pivoted at 17 to a lug 18 that rises from the bed plate 12. The outer end of the lever is forked to receive an eccentric 20 that is pivoted to the forked end of the lever by trunnions 21 and is provided with a hand piece 22 by which the eccentric is operated to clamp the member 15 upon the flue. The said eccentric bears upon a suitable fixed part of the machine frame in the manner of the clamping actuating eccentric 29, hereinafter described, whereby, when the eccentric is swung inwardly, the clamping member 15 is pressed toward the flue section as described. To release the flue section the eccentric and its hand piece are swung outwardly. The said clamping member 15, as herein shown, constitutes one of the electrodes through which current is conducted to the flue, and is provided with a lining 24 of copper or other good conducting material adapted for contact with the flue and to which one side of the welding circuit is connected, as will hereinafter appear. The clamp formed by the clamping members 14, 15 is a fixed clamp and holds the flue section A fixed in place.

25, 26 designate, respectively, the lower and upper clamping members to receive the short piece or "safe end" B of the flue. The clamping member 26 is movable relatively to the lower member 25 to thereby clamp it on the section B, and is carried by a lever 27 which is pivoted to the machine frame at 28. The clamping member 26 is locked on the tube by an eccentric 29 having a hand piece 30, the eccentric acting on an extension 31 of the fixed member 25 of the clamp or other fixed part of the machine, as best shown in Fig. 3. The said movable clamp forms the other electrode of the welding circuit, and the movable clamping member thereof is provided with a lining 32 of copper or other good conductive material for contact with the "safe end" of the flue. The clamp for the short or "safe end" B is movable toward and from the fixed clamp so as to press the tube section B carried thereby into welding contact with the longer tube section A. The said lower clamping member 25 of the movable clamp is mounted on a sliding carriage 35 which is supported on the bed plate 11 of the frame and is guided in its movement by means of suitable gibs 36 bolted or otherwise secured to the bed plate (Figs. 2 and 3). The carriage thus movable on the bed plate is adapted to be moved by means of a rack and pinion mechanism, embracing a rack 38 fixed to the bed plate and a pinion 39 that is fixed to the inner end of and turns with a short horizontal shaft 40 that is rotatively mounted in the carriage. Said shaft is provided at its outer end with a hand wheel 41 by which it may be rotated. Rotation of the hand piece therefore, toward the right hand end of the machine serves to carry the "safe end" clamp or electrode toward the fixed clamp or electrode.

In order that two tube sections may not be pressed together with too great a force under welding heat, I preferably provide a yielding lost motion between the lower relatively fixed clamping member 25 and the carriage 35. This construction is most clearly shown in Fig. 2, wherein it will be noted that said clamping member 25 is a part separate from the carriage 35, and is provided at its sides and at the bottom thereof with laterally extending flanges 43 which are engaged by gibs 44 suitably fixed to the upper side of the carriage. A stiff spring 45 is interposed between the rear end of the said clamping member 25, and an upstanding abutment 46 made part of or supported on the carriage 35. When the carriage 35 is retracted and no work is in the machine, the spring 45 presses a shoulder 49 of the clamping member 25 against a shoulder 48 on the carriage 35 which limits movement of the lower clamping member on said carriage in one direction. When the pressure exerted to force the tube sections together overcomes the normal compressive force of the spring 45 the said spring permits the carriage 35 to advance relatively to the movable clamp. Thereby the force required to properly press the tube sections together may be ascertained and maintained to suit the particular requirements of the work. Engagement of the shoulder 48 of the carriage with the shoulder 49 of the movable clamp serves, in the retractive movement of the carriage, to retract the movable clamp, as will be apparent.

The means hereinbefore described constitute the essential features of one type of a welding machine for welding flues and like articles. In accordance with my invention I provide means, which are operable immediately after the welding operation has been completed, and without removing the work from the machine, to roll down the annular beads or projections *a*, *a'* formed on the inner and outer surfaces of the flue, so as to thereby provide smooth inner and outer surfaces at the welded joint. The means for effecting this result are so arranged as to be readily applied to the tube before the heat is substantially conducted away from the joint by the adjacent colder parts of the tube. Inasmuch as the zone of heat on the tube in an electrical welding process is relatively narrow, it becomes important that the rolling or smoothing means shall be so located relatively to the welding means that they may be brought into immediate action. This may be effected either by moving the welded tube to the rolling means or moving the rolling or smoothing means to the welded tube. The latter arrangement is herein shown and is made as follows: The flue section A extends rearwardly from the fixed clamping device through the shell 50 that is supported on the bed plate 12, it being clamped at one end in a bearing 51 mounted on said bed plate. The said shell terminates short of the movable or "safe end" clamp. Mounted on said shell to rotate thereon is a hub 55 of a large gear wheel 56. The said gear wheel is provided on diametrically opposite sides of its axis with two pairs of webs or plates 57, 57, best shown in Figs. 1 and 4. Each pair of webs is formed at the rear or free edges thereof with a transverse widened head 60 which is provided with radial guide grooves 61 to receive and guide reciprocating rollers carrying blocks 62, said blocks carrying at their lower ends smoothing or finishing rollers 63 adapted to be pressed upon and bear against the exterior wall of the flue at the welding joint thereof. The said sliding blocks 62 are operated through the medium of levers 65 provided at their ends with heads 66 which enter bearing openings 67 in the sliding blocks. The said levers extend forwardly through the large gear wheel 56 between the webs 57, and are pivoted to fulcrums 68 carried by said webs. At their front ends the said levers 65 are connected by short pivotal links 70 to a sliding collar 71 which fits upon and is adapted to slide longitudinally of the shell 50 and to rotate thereon, as best shown in Fig. 1. The said collar is actuated, as herein shown, from a treadle 72 at the right hand side of the machine which is fixed to a horizontal rock shaft 73 that is mounted in suitable bearings 74, 74 carried by the machine frame. The said rock shaft is provided with upwardly extending fixed arms 75, one at each side of the axis of the shell 50, and said arms are provided at their upper ends with inwardly turned lugs 76 to engage in an annular groove 77 of the collar 71, whereby is provided an interlocking and rotative connection between said arms and said collar. With this construction it will be noted that when the treadle is depressed the collar 71 is slid rearwardly on its bearing, with the result of swinging the rearward ends of the levers 65 inwardly to thereby carry the smoothing or forming rollers 63 inwardly against the exterior wall of the flue at the welded joint. The said rollers may be retracted away from the flue by means of a spring 78 which surrounds said shell 50 and interposed between the hub 55 of the gear wheel 56 and said collar 71. The said smoothing or forming rollers 63, of which there may be one or more, are adapted to be revolved about the flue when pressed inwardly thereagainst. Revolution of said rollers and the parts which carry the same is shown as effected through means of a shaft 80 mounted in bearings 81, 81 supported on the machine frame, and provided with a pinion 82 which meshes with the gear wheel 56. The shaft is also provided with a belt pulley 83 by which it may be driven from any convenient source of power.

The smoothing mechanism described may be used in a machine for welding round bars and where, therefore, the bead at the welded joint is an exterior bead only. In the machine illustrated, however, designed for welding boiler flues and like tubular articles, it is desirable that the inner wall of the flue be also subjected to a rolling or other pressure to remove or smooth down the interior bead at the welded joint. To this end, I provide a rotative mandrel 85 which is mounted on the forward end of a rotative shaft 86 that is arranged axially in line with the flue clamping devices and, as herein shown, is movable toward and from the welding position of the flue. The said shaft is rotatively mounted in an upstanding bearing 88 which is carried by and made part of a carriage 89 that has longitudinal sliding engagement with the bed plate 11 and is guided by the gibs 36. The shaft 86 is held from axial displacement in the bearing 88 by means of flanges or collars 90, 90 fixed thereto in any suitable manner and engaging the opposite side of said bearing, as clearly indicated in Figs. 1 and 2. The carriage for the shaft of the interior mandrel 85 may be actuated to move the same toward the welding position of the flue by means of the fixed rack bar 38 and a pinion 92 that is fixed to a short horizontal shaft 93 rotatively mounted in the carriage 89 and which extends outwardly toward the side of the machine adjacent to the hand wheel 41. It is provided at its outer end with a hand wheel 94 by which it is rotated to move the roller or mandrel 85 into and out of the welded flue. The said hand wheels 94, 41, as well also as the treadle 72, are in position to be operated from a single position of the operator.

The shaft 86 is rotated so as to rotate the mandrel 85 in contact with the inner wall of the flue by means of a gear wheel 95 which is keyed to a sleeve 96 which is operatively mounted in an upstanding bearing 97 at the rear end of the machine frame, and through which sleeve the shaft 86 extends and is adapted to slide. The said sleeve 96 and the shaft 86 are provided, one with a key way and the other with a key or spline, so as to permit axial movement of the shaft 86 while affording an interlocking connection therebetween. The gear wheel is driven from the rear shaft 80 through the medium of a pinion 98 which meshes with said gear wheel.

Preferably, the forming mandrel 85 will be provided with a series of longitudinally disposed, angularly spaced smoothing rollers 100 which are mounted in recesses in the mandrel so as to rotate freely therein. This construction reduces to a minimum a frictional resistance between the mandrel and the wall of the flue.

The fixed and movable clamps or electrodes of the machine may be connected in any suitable manner in circuit with a generator 101, the circuit being adapted to be opened by a switch 102. The switch may be located on a part of the machine closely adjacent to the hand wheels 41, 94 and treadle 72 so as to be in convenient access to a single operator of the machine.

In operation, the longer flue section A is clamped in the front clamping device and is thereby held fixed in the machine. The shorter or "safe end" of the flue is placed in the movable clamping device. Thereafter the said shorter flue end is pressed into endwise contact with the longer section of the flue and the switch 102 is closed to close the welding circuit through the flue sections. Pressure is exerted to press the flue sections together through the medium of the hand wheel 41. After welding has been effected the forming rollers 63 are moved inwardly, through the medium of the treadle 72, and the various actuating connections controlled thereby, as described, and, at the same time, the mandrel 85 is moved into the interior of the flue through the action of the hand wheel 94. By reason of the adjacency of said forming rollers and mandrel, and the facility by which they may be moved into contact with the welded joint, such rolling or smoothing action may be reliably effected before the joint becomes cool. In Fig. 7 is shown the relation of the smoothing or forming rollers to the flue joint after the joint has been completely welded, while Fig. 8 shows the completed joint after the smoothing or rolling operation has taken place.

In Fig. 9 are shown the elements of a welding machine, wherein the welded flue is bodily movable, after the welding operation, to relatively fixed joint finishing elements. As shown in Fig. 9, 106, 106 designate two supports or electrodes to receive and hold in endwise contact the members A and B of the flue, one of which electrodes is preferably movable toward and from the other. 107, 107 designate external joint finishing rollers and 108 designates the associated interior joint finishing roller or mandrel. The said joint finishing roller 108 is axially fixed relatively to the flue, and in the operation of the machine, the upper clamping members 109, 110 of the electrodes 106, 106, respectively, are released and the welded flue is axially shifted rearwardly to bring the joint in the plane of the finishing rollers, 107, 107, 108 whereupon the external rollers 107 are moved inwardly against the joint. The flue may be held by hand, or otherwise, while being rolled. Conveniently both clamping members 109, 110 may be operated by a single manually operable device, as indicated in Fig. 9.

The internal roller or mandrel 108 is mounted on the front end of a shaft 112 which may, if desired, be rotatively mounted in any suitable manner, not necessary to be herein shown, in the machine frame. The external rollers 107 are carried by blocks 114 which are radially slidable in the frames 115 carried by the gear wheel 119, and said slides are shifted inwardly and outwardly by levers 118 pivotally mounted in a gear wheel 119 and operated in the same general manner as hereinbefore described with respect to Figs. 1, 2 and 3.

In the construction shown in Figs. 10 and 11, the external rollers are replaced by a fixed and a movable die, 120, 121, respectively, to the space between which the welded joint is shifted after the welding operation, as shown by the dotted lines in Fig. 10. The movable die 121 may be pneumatically or hydraulically actuated to press or reciprocate it toward the joint. As shown, said movable die is fixed to a stem 122 of a pneumatic hammer device which is associated in a known manner with a cylinder and a piston to give rapid reciprocating impulse to the movable die or hammer. When said machine assumes the hammer type, the flue may be slowly rolled by hand during the hammering operation so as to present all parts of the joint to the dies.

The joints shown in Figs. 1, 2, 7, 8, 9 and 10 are butt-welded joints, in the production of which the squared ends of the flues are pressed together during the welding heat. In this type of joint, the displacement of metal at the joint produces a relatively pronounced external and internal bead or projection, which is pressed down by the means hereinbefore described.

In some instances, the flues may be joined by the lap joint, shown in Fig. 12. In this arrangement, both the members $a'$, $b'$ of the flue are scarfed at their ends, one adapted to receive the other, and the welding heat is effected by the resistance due to the passage of current between the relatively long lapping contact between said members. The members may, or may not, be pressed actively together during the welding heat.

In the arrangement shown in Fig. 13, one of members $a^2$ of the flue is exteriorly scarfed or tapered at its end while the other member $b^2$ is expanded or up-set, as at $a^3$ to fit over the scarfed or tapered end of the member $b^2$.

While the machine herein shown is adapted to electrically heat the articles to be welded together, it is to be understood that the joint smoothing or rolling mechanism may be well adapted to other forms of welding machines wherein the articles are held or pressed in contact in the general manner described during the time that the temperature of a relatively narrow zone or section of metal at the joint is raised to a welding heat. Owing to the difficulty of insulating the bearings, for the rolling mechanism from the high tension welding current, it is preferable to apply the smoothing or forming rollers after the current has been cut off from the flue. However, such rolling or smoothing pressure may be effected simultaneously with the application of the latter stages of the welding heat if proper insulating means be embodied in the machine structure.

While I have shown a number of practical embodiments of my invention it is to be understood that the invention is not limited to the details of the disclosure herein except as made the subject of specific claims, and as imposed by the prior art.

I claim as my invention:—

1. A flue-welding machine, comprising means to hold two flue sections in end to end contact during the application of the welding heat, and simultaneously operated external and internal smoothing means to smooth down the metal at the interior and exterior of the welded joint.

2. A welding machine for welding tubular articles comprising means to support and press together, during the welding heat, said articles and rolling means to simultaneously engage both inner and outer walls of the article at the joint to roll or press the displaced metal thereat to produce a smooth joint at the inner and outer sides of the tube.

3. A welding machine for welding tubular articles comprising means to hold in endwise contact the articles to be welded, forming means to engage both the inner and outer sides of the articles at the joint to roll down or press the displaced metal thereat, the external forming means being movable radially toward the work, and the internal forming means being movable axially toward and from the work, and coöperating means for the forming means.

4. A tube welding machine comprising combined supporting devices and electrodes of opposite polarity, and inner and outer joint smoothing means for the welded joint comprising unitary parts of the machine and adapted to act upon the heated joint while supported in said machine.

5. A welding machine comprising means for holding pressed in endwise contact the articles to be welded and finishing elements for smoothing down the heated displaced metal at the joint to produce a smooth welded joint, said finishing elements being revoluble about and movable radially toward the joint.

6. A welding machine comprising a frame, clamping devices thereon to receive and hold the articles to be welded, one of said clamping devices being movable toward and from the other to exert endwise pressure on the articles during the welding heat, and means to roll down the displaced metal at the joint, comprising smoothing rollers movable toward and from the joint, a rotative member mounted on said frame carrying said rollers, and means to move the rollers against and away from the joint.

7. A welding machine comprising a frame, means thereon to receive and hold endwise in contact the articles to be welded, and means to roll down the displaced metal at the joint comprising external smoothing rollers movable toward and from the joint, a rotating member mounted on said frame carrying said rollers, and means to move the rollers against and away from the joint, combined with an internal rolling device disposed in axial alinement with said clamps, and means whereby it may be shifted into and away from the joint.

8. A welding machine comprising a frame, means thereon to hold the articles endwise in contact during the welding heat, a member rotatively mounted in the frame, with means for rotating the same, smoothing rollers carried by the rotative member and radially movable toward and from and adapted to rollingly engage the welded joint, and means to move the blocks inwardly against the joint, combined with automatic means to move the rollers away from the welded joint.

9. A welding machine for tubular articles comprising a frame, clamping devices thereon to receive and support said articles, smoothing rollers adapted to roll down the metal exteriorly displaced at the joint during the welding operation, and an internal smoothing roller arranged in alinement with the clamping devices, with means to rotate it and means to move the same toward and from the interior of the welded joint.

10. A welding machine for tubular articles comprising a frame, clamping devices thereon to receive and support said articles, smoothing rollers adapted to roll down the metal exteriorly displaced at the joint during the welding operation and an internal smoothing roller arranged in alinement with the clamping devices, a shaft for carrying said internal roller, a carriage movable longitudinally of the said frame in which said shaft is rotatively mounted, means for rotating the shaft and means for moving the carriage and said shaft toward and from the interior of the welded joint.

11. A welding machine for tubular articles comprising a frame, clamping devices thereon to receive and support said articles, smoothing rollers adapted to roll down the metal exteriorly displaced at the welded joint during the welding heat, an internal smoothing roller arranged in alinement with the clamping devices, a shaft for carrying said internal roller, a carriage movable longitudinally on said frame in which said shaft is rotatively mounted, and means for shifting the shaft toward and from the welding position of the joint, comprising a fixed rack on the frame, a rotative shaft mounted on the carriage and a pinion fixed to the shaft meshing with said rack.

12. In a tube welding machine, a fixed clamping device, a movable clamping device with means to move it toward and from the fixed clamping device, said means embracing yieldable lost motion means, and a joint forming mandrel movable into and out of the tubular joint and having a fixed length of movement.

13. In a welding machine, a fixed clamping device to receive one of the articles to be welded, a movable clamping device to receive the other article, a carriage on which the movable clamping device is mounted, constructed to move the latter clamping device toward the fixed clamping device to press together the articles to be welded, a spring arranged between said movable clamping device and carriage to permit the carriage to be advanced relatively to the movable clamping device when said articles are pressed together, and a joint forming mandrel movable axially into and out of the tubular joint, with means for actuating the same.

14. A welding machine for tubular articles comprising a frame, clamping devices thereon to receive and support said articles, smoothing rollers adapted to roll down the metal exteriorly displaced at the welded joint during the welding operation, with means to move said rollers toward and from the exterior of the welded joint, a rotative member carrying said rollers, an internal smoothing roller axially movable toward and from the interior of the welded joint, and a shaft geared to said roller and to said rotative member for rotating the said parts.

15. A welding machine comprising a frame, clamping devices to receive the articles to be welded, smoothing means acting on the exterior of the joint, an internal smoothing roller, a shaft carrying said roller and means to rotate the shaft, said shaft being endwise movable on the frame and relatively to its rotating means to move the internal roller toward and from the interior of the welded joint and means to give endwise movement to the shaft.

In testimony that I claim the foregoing as my invention I affix my signature in the presence of two witnesses, this 21" day of April, A. D. 1914.

EDWARD T. HENDEE.

Witnesses:
W. L. HALL,
G. E. DOWLE.